June 7, 1966 — M. CAMRAS ETAL — 3,254,858

TRANSDUCER MACHINE

Filed Aug. 1, 1963 — 5 Sheets-Sheet 1

INVENTORS
MARVIN CAMRAS
STANLEY A. GALUS

BY Hill, Sherman, Meroni, Gross & Simpson

ATTORNEYS

INVENTORS
MARVIN CAMRAS
STANLEY A. GALUS
BY Hill, Sherman, Meroni, Gross & Simpson
ATTORNEYS

INVENTORS
MARVIN CAMRAS
BY STANLEY A. GALUS

Hill, Sherman, Meroni, Gross & Simpson
ATTORNEYS

TRANSDUCER MACHINE

Filed Aug. 1, 1963 5 Sheets-Sheet 4

INVENTORS
MARVIN CAMRAS
STANLEY A. GALUS
BY
Hill, Sherman, Meroni, Gross & Simpson
ATTORNEYS INVENTORS
MARVIN CAMRAS
STANLEY A. GALUS
BY
Hill, Sherman, Meroni, Gross & Simpson
ATTORNEYS

United States Patent Office 3,254,858
Patented June 7, 1966

3,254,858

TRANSDUCER MACHINE

Marvin Camras, Glencoe, and Stanley A. Galus, Chicago, Ill., assignors to IIT Research Institute, Chicago, Ill., a corporation of Illinois Filed Aug. 1, 1963, Ser. No. 299,208
13 Claims. (Cl. 242—55.13)

This invention relates to an automatic threading transducer machine and particularly to an adaptor mechanism for application to conventional tape recording machines to render such conventional machines capable of automatic threading.

The adaptor mechanism of the present invention is particularly useful with a single spool cartridge such as disclosed in a copending application U.S. Serial No. 124,683, filed July 17, 1961, and assigned to the same assignee as the present invention.

The single spool cartridge disclosed in the prior application is of a uniquely simple configuration and comprises an ordinary spool having means thereof for retaining the end of a record medium threading portion therewith regardless of the point about the periphery of the spool at which the free end of the threading portion is located. One embodiment of the invention involves a spool having peripheral shoulder portions projecting axially inwardly from the peripheral edges of the flanges and defining a slot narrower than the width of the threading portion of the record medium but greater than the width of the active portion of the record medium. Since the confronting peripheral shoulder portions are symmetrical about the central axis of the spool, the end of the threading portion may be located at any point about the circumference of the spool and still be effectively retained by the confronting shoulder portions.

Such a single spool cartridge has unique advantages over the types of magazines which have been proposed. For example, magazine units having two spools permanently therein are relatively bulky and costly and unreliable and are not compatible with existing conventional machines. An endless band type magazine has the disadvantage that the record must be run through entirely to return to the beginning of the record, that is the direction of movement of the record cannot be reversed. Records of any considerable length are likely to bind and jam the supply system, and the record must be hand-threaded or else the magazine must be relatively costly and contain relatively unreliable parts. This endless band type magazine is also not generally compatible with conventional machines.

In U.S. Patent 3,025,011, issued March 13, 1962, there is disclosed an automatic threading system utilizing a special take-up arrangement which is not interchangeable with the single spool cartridge magazine associated with the supply spindle. An important feature of the present invention resides in the provision of improved automatic threading means facilitating the use of identical supply and take-up cartridges which may be inverted and interchanged and the record medium again automatically threaded to play a second channel or channels on the record medium. Further, the machine of the prior patent was a specialized machine for carrying out the automatic threading operation, and it would be highly desirable to have a mechanism which could be applied to existing conventional machines in a simple manner so as to convert such existing machines to automatic threading.

It is therefore an important object of the present invention to provide an automatic threading adaptor mechanism applicable in a simple manner to existing conventional manually threaded machines to convert such machines to automatic threading operation.

It is another object of the present invention to provide an automatic threading transducer machine having interchangeable supply and take-up single spool cartridges.

It is a further important object of the present invention to provide a novel automatic threading transducer machine which does not require a pre-threaded leader.

Another object of the invention in to provide a novel single spool cartridge for an automatic threading transducer machine.

A further object of the invention is to provide an automatic threading mechanism which may be applied to existing tape transport mechanisms without requiring substantial reconstruction thereof.

Still another object of the present invention is to provide a novel mechanism for stripping the end of a threading portion of a single spool cartridge from the cartridge and conducting the same along a transducing path to a position for engagement with a take-up device.

A further object of the present invention is to provide a novel mechanism for automatically engaging a threading portion of a record medium with a take-up device.

Other objects, features and advantages of the present invention will be apparent from the following description taken in connection with the accompanying drawings, in which:

FIGURE 1 is a somewhat diagrammatic top plan view of an automatic threading transducer mechanism in accordance with the present invention applied to a conventional magnetic tape recorder;

FIGURE 1A on a sheet of the drawings is a somewhat diagrammatic horizontal sectional view showing certain details of the play-stop-thread control of FIGURE 1;

Figures 1A, 5:
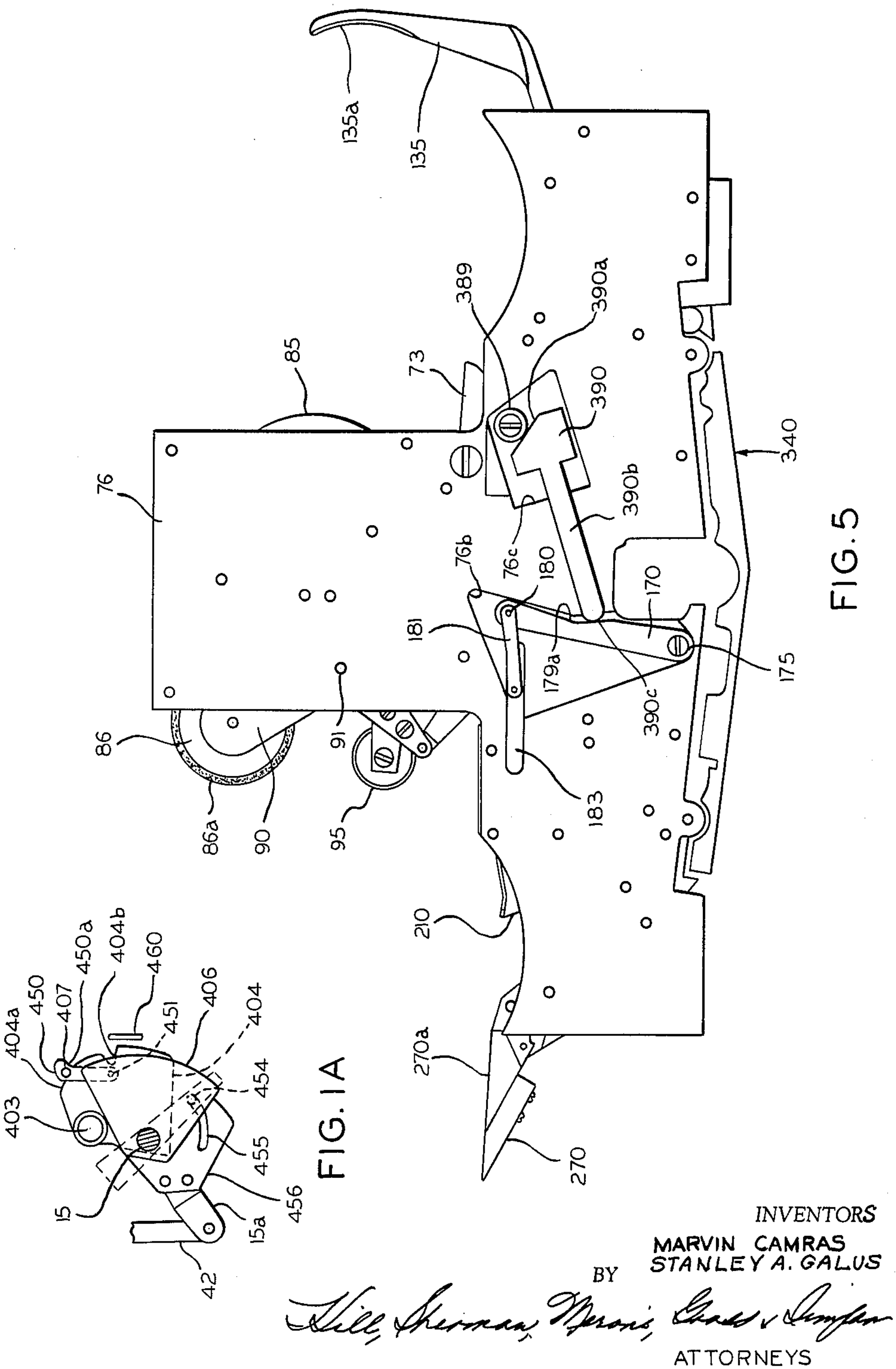
Figure 2:
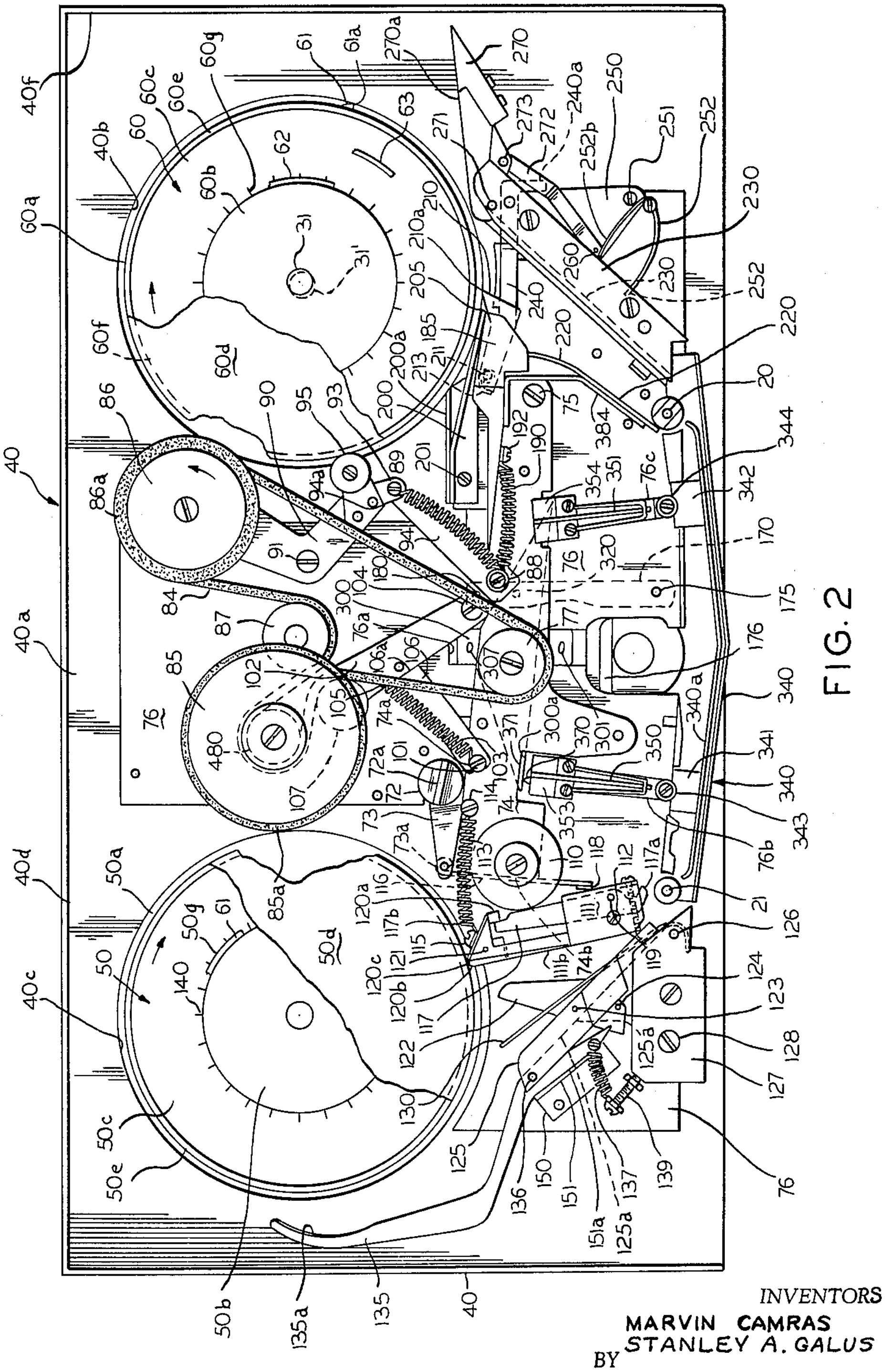
FIGURE 2 is a bottom plan view of the automatic threading adaptor mechanism of the present invention in its inactive condition.
Figures 3, 4:
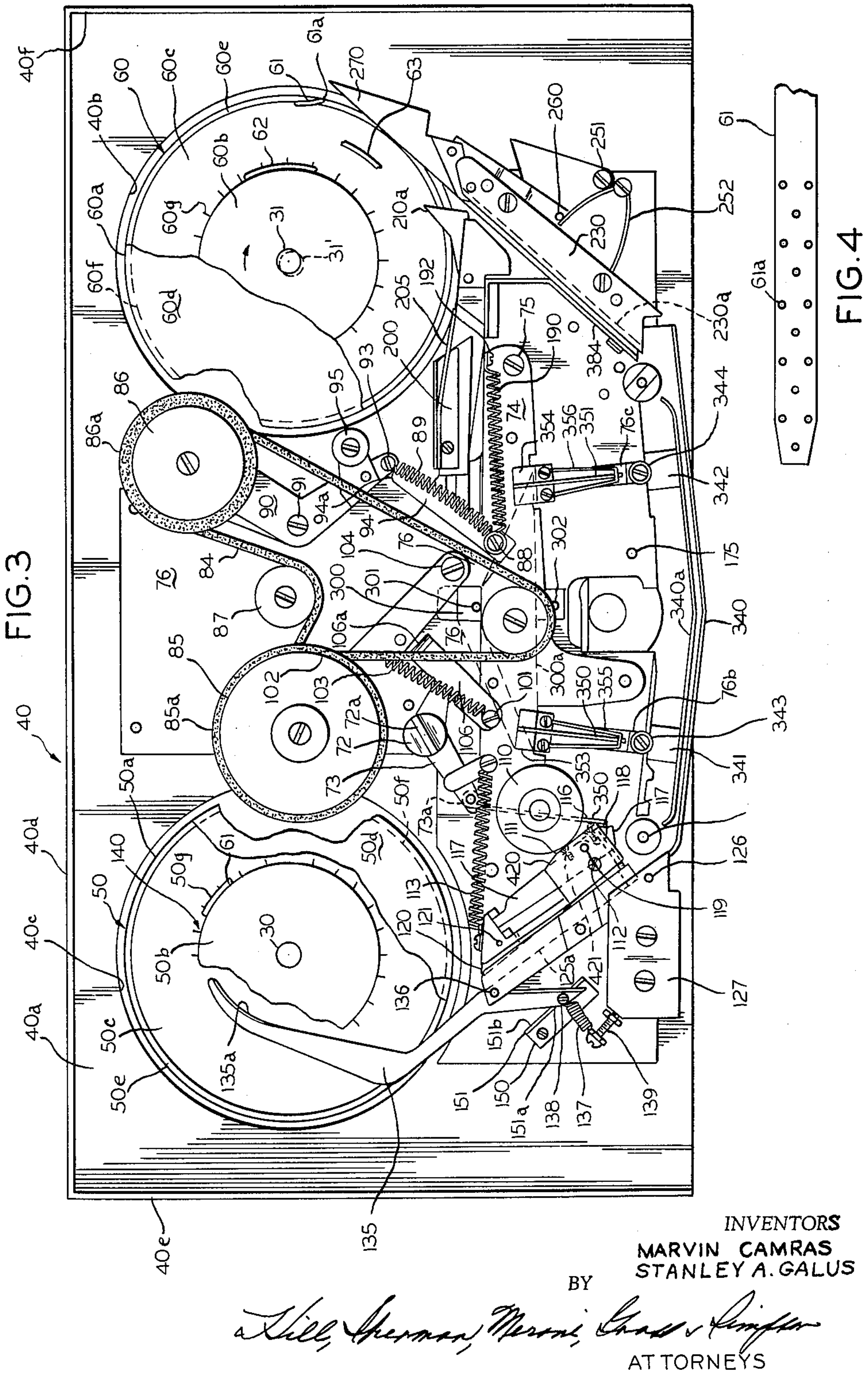
FIGURE 3 is a bottom plan view similar to FIGURE 2 but showing the automatic threading mechanism in position for carrying out an automatic threading operation.
Figure 3A:
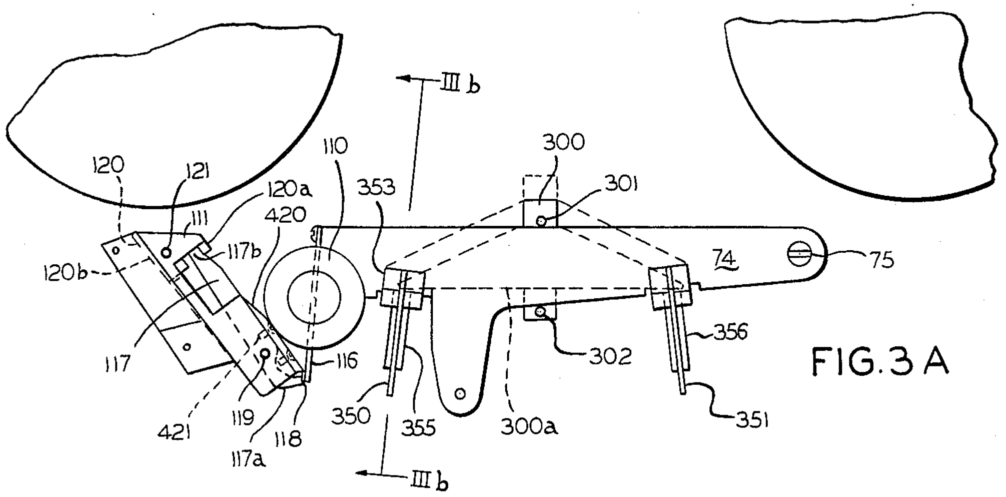
Figures 3B, 6, 7:
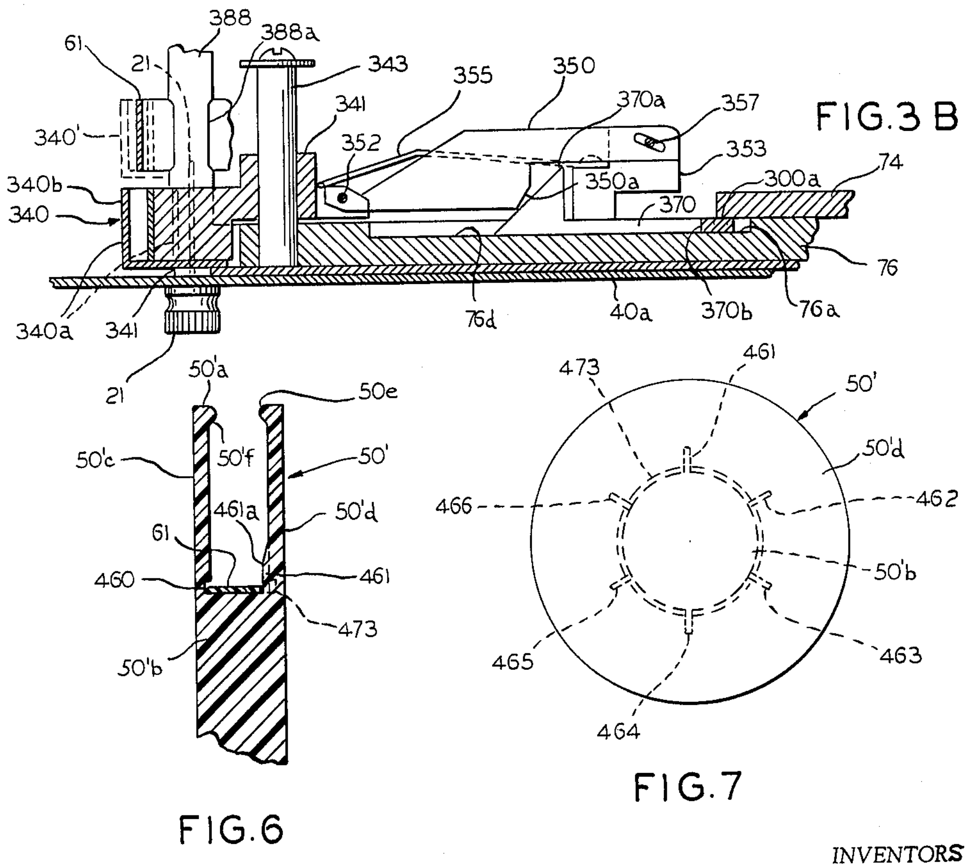

FIGURE 3A on Sheet No. 5 of the drawings, is a somewhat diagrammatic bottom plan view of certain of the structure of FIGURE 3;

FIGURE 3B is a vertical sectional view also somewhat diagrammatic taken generally along the line IIIB—IIIB in FIGURE 3A;

FIGURE 4 on Sheet 3 of the drawings is a somewhat diagrammatic view of the end portion of the threading leader which is coupled to the take-up cartridge in FIGURE 3;

FIGURE 5 is a somewhat diagrammatic top plan view of the mechanism of FIGURE 2 with the cover plate and a second plate removed to show internal movable parts;

FIGURE 6 is a fragmentary vertical sectional view of a modified cartridge for use in a machine in accordance with the present invention; and FIGURE 7 is a side elevational view of the cartridge of FIGURE 6.

In the illustrated embodiment a conventional magnetic tape recorder 10 such as a Webcor stereo tape recorder is provided with mechanism to adapt the machine to automatic threading in accordance with the present invention. The conventional machine includes a cabinet 11 with a control panel 12 including a change speed control 13, and a forward, rewind control 14. A shaft 15 is provided with a control knob similar to the knob 14 and is designed to shift the apparatus between "stop" and "play" or "record" position. If a recording operation is desired, slide button 17 is actuated to record position, the left-hand position, along with actuation of shaft 15 to its left-hand or extreme clockwise position. The conventional mechanism further includes suitable guideposts associated with screws 20 and 21 for guiding the tape during a transducing operation. An erase head is indicated at 23 and a stereo record-playback head assembly is indicated at 24. A tape driving capstan 25 is driven at constant speed during record and play modes for propelling the tape past erase head 23 and record-playback head 24. The conventional machine is constructed so that take-up spindle 30 is driven at high speed when the control knob 14 is in the "forward" position and the supply shaft 31 is driven in the clockwise direction at high speed in the "rewind" position of control 14 so as to rewind the tape onto the supply reel associated with spindle 31. In "stop" position of shaft 15, braking means such as indicated at 33 is applied to a disk 34 associated with the supply spindle 31.

The components thus far described are entirely conventional so that a more detailed description thereof is deemed unnecessary.

In adapting the conventional mechanism for automatic threading, in the illustrated embodiment, the usual cover plate for heads 23 and 24 and capstan 25 is removed, and an adapter assembly 40 is applied over the entire tape transport area and may be secured in place by means of screws 20 and 21 which normally secure an abbreviated cover plate over the parts just mentioned.

In adapting the conventional machine to automatic threading, shaft 15 is provided with an arm 15*a* which is coupled by links 42 and 43 to a belt tensioning roller 44. When shaft 15 is moved to the "thread" position which is the position indicated in FIGURE 1, tensioning roller 44 tensions belt 46 so as to drive a pulley 47 associated with take-up spindle 30 from a drive pulley 49. A take-up cartridge such as indicated at 50 in FIGURE 1 on the take-up spindle 30 is thus driven at a constant speed during the tape threading operation which speed is comparable to the no load speed of the take-up spindle 30 with the control shaft 15 in the "play" or "record" position. Linkage 42 is also coupled by means of an arm 52 to a rotatable member 53 having a cable 54 extending partially therearound and secured to the arm 52. Upon movement of the shaft 15 to its extreme counterclockwise position, linkage 42 pivots arm 52 and member 53 about the axis of member 53 so as to pull connecting cable 54 to the right disengaging the brake means 33 by pivotal movement thereof about the pivot point 56 against the action of a tension spring 57. When control shaft 15 is moved to the "stop" position, the tension applied to cable 54 is relaxed, allowing spring 57 to pivot brake arm 33 about shaft 56 to apply braking force to disk 34 associated with supply spindle 31.

The adaptor mechanism 40 includes a top cover plate 40*a* having apertures 40*b* and 40*c* therein through which the supply cartridge 60 and take-up cartridge 50 may be applied to spindles 31 and 30, respectively. Suitable means may, of course, be provided for providing manual access in the placement and removal of the cartridges 50 and 60; for example, notches (not shown) may be provided adjacent apertures 40*b* and 40*c* for receiving the fingers in grasping of the cartridges.

The cartridges 50 and 60 of the illustrated mechanism are substantially identical to the cartridge illustrated in U.S. Patent No. 3,025,011, issued March 13, 1962 and in copending application Serial No. 124,683, filed July 7, 1961. The disclosure of the copending application is incorporated herein by reference in its entirety. The cartridges 50 and 60 may have peripheral portions 50*a* and 60*a* provided by the edge surfaces of the respective flanges which extend from opposite sides of the central hub portion 50*b* and 60*b*. The upper flanges are indicated at 50*c* and 60*c* in FIGURE 3 (which is a bottom plan view) while the lower flanges are indicated at 50*d* and 60*d* in FIGURE 3. The inwardly projecting ribs or shoulder portions extending about the peripheries of the flanges are indicated at 50*e*, 50*f* and 60*e* and 60*f* in FIGURE 3.

The hubs 50*b* and 60*b* are each provided with teeth such as indicated at 50*g* and 60*g* for engaging in cooperating apertures such as indicated at 61*a*, FIGURE 4 in threading leaders such as diagrammatically indicated at 61 and 62 in FIGURE 3. Each of the leaders 61 and 62 has a width somewhat less than the spacing between flanges 50*c*, 50*d* and 60*c*, 60*d* and greater than the spacing between the confronting annular ribs or shoulder portions 50*e*, 50*f* and 60*e*, 60*f* on the respective flanges of the supply and take-up cartridges. The record medium 63 is a conventional tape record medium having a width somewhat less than the space between the confronting shoulder portions 50*e*, 50*f* and 60*e*, 60*f*. The record medium is wound in a coil on the hub 60*b* and at its inner end connects with the end of threading leader 62 and at its outer end connects with threading leader 61.

As seen in FIGURE 2, top plate 40*a* may be provided with a marginal flange 40*d* across the rear edge thereof and may be provided with side flanges 40*e* and 40*f*. The mechanism such as indicated at 33, 34, 42, 43, 44, 46, 49, 52, 53, 54, 56 and 57 is located below the deck plate of the machine on which the bottom edges of flanges 40*d*, 40*e* and 40*f* rest. The base deck plate is visible at 70 in FIGURE 1 where the adaptor cover plate 40*a* is broken away. The rotatable member 53 is provided with a driving slot 53*a*, FIGURE 1, which receives a tongue 72*a*, FIGURE 2, of a member 72 when the adaptor mechanism 40 is secured in position as shown in FIGURE 1.

Figure 1:
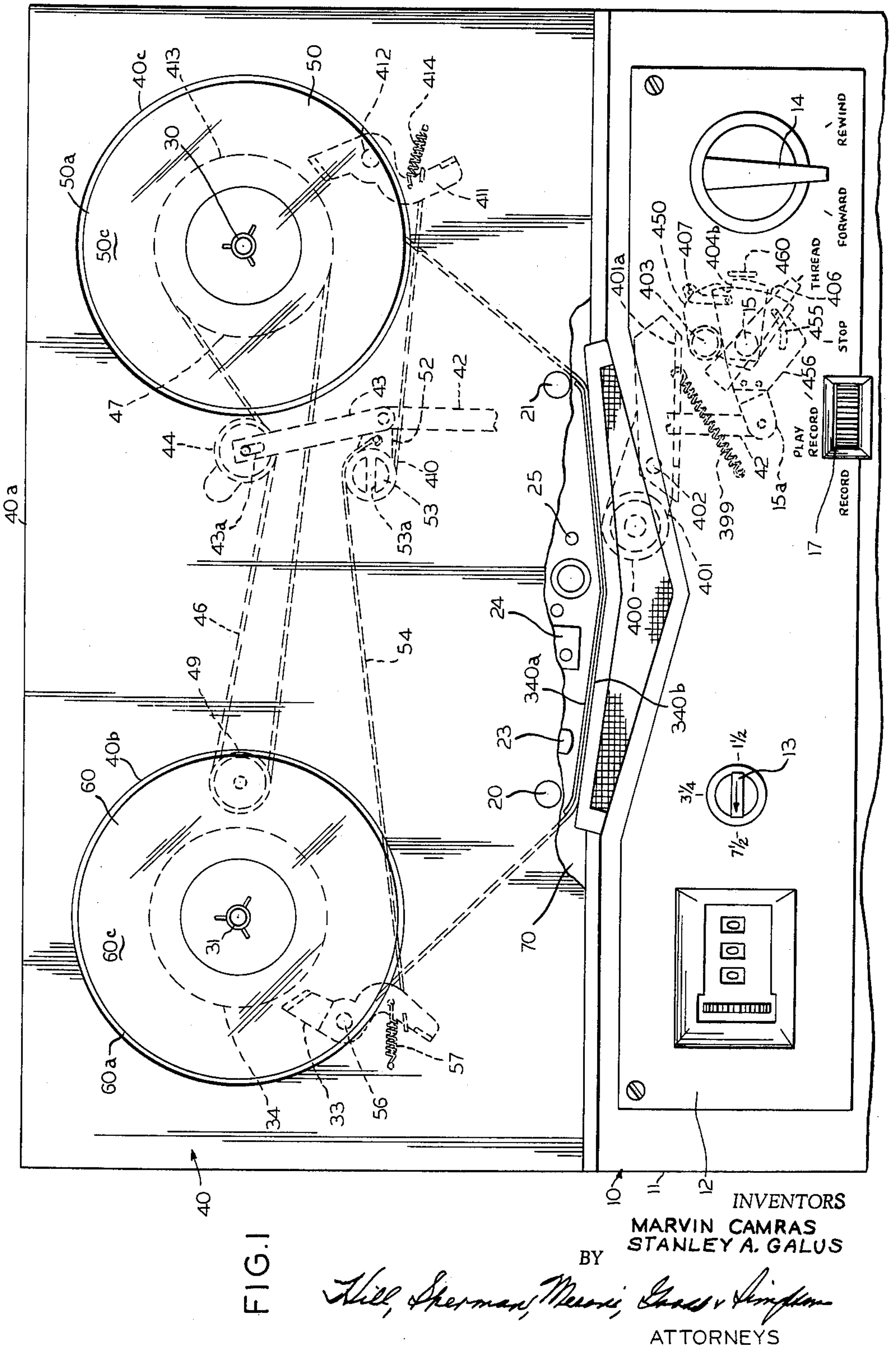

Thus, rotation of shaft 15, rotates member 53 is a clockwise direction as viewed in FIGURE 1 corresponding to a counterclockwise direction in FIGURE 2 so as to actuate arm 73, FIGURE 2, in a counterclockwise direction. The arm 73 is provided with a roller 73*a* riding on a back edge face 74*a* of a slide plate 74 which is pivotally mounted at 75 on a reinforcing plate 76 secured to the underside of cover plate 40*a*.

The slide plate 74 carries a pulley 77 which receives a belt 84. The belt extends about a pulley fixed to the shaft of roller 85 and extends about a pulley fixed to the shaft of roller 86. An idler pulley 87 has its shaft secured to plate 76.

The slide plate 74 carries a pin 88 to which is secured one end of a tension spring 89, the other end of which is connected with an end of an arm 90 pivotally mounted at 91 to the plate 76. The spring 89 is secured to a screw 93 carried at the end of arm 90 opposite the end carrying the roller 86. An arm 94 is rigidly secured to slide plate 74 by the element 88 so that the arm makes a fixed angle with respect to the slide plate 74. The end 94*a* of arm 94 abuts the end of arm 90 to prevent pivotal movement of the arm 90 in the clockwise direction under the impetus of tension spring 89 in the inactive position of slide 74. An idler roller 95 is secured to arm 90 and rotatably mounted so as to engage the leader and press the same into engagement with the supply cartridge during a rewind operation with the parts in the position shown in FIGURE 2 (except that spindle 31 shifts to position 31′ during rewind in the conventional machine to which the present invention has been applied).

An arm 102 carries roller 85 and is urged in the counterclockwise direction with respect to its pivot 104 by means of a tension spring 103 secured at 101 to slide plate 74 and secured at its opposite end by means of a pin 105 to the arm 102. The arm 102 also carries an idler pulley 107 (FIGURE 2) for the belt 84.

An arm 106 is secured at a fixed angular position with respect to the slide plate 74 by means of the screw 101 and has a free end 106*a* abutting a side edge of arm 102 in the inactive position of slide plate 74 shown in FIGURE 2.

As the slide plate 74 is pivoted about its pivot point 75 by means of arm 73, fixed arms 94 and 106 secured to the slide plate move an appreciable distance so as to allow tension spring 89 to project the friction surface 86*a* of roller 86 into engagement with the periphery of supply cartridge 60 and so as to enable tension spring 103 to move friction surface 85*a* of roller 85 into engagement with the periphery of the take-up cartridge 50. The active positions of rollers 85 and 86 are shown in FIGURE 3. The movement of slide plate 74 is sufficient so that springs 89 and 103 resiliently urge the rollers 86 and 85 into engagement with the respective cartridges to provide a driving connection from the take-up cartridge to the supply cartridge through belt 84 in the active position of slide plate 74 shown in FIGURE 3.

Movement of the slide 74 to the active position also causes a roller 110 carried on slide plate 74 to engage an arm 111 which is pivotally mounted at 112 so as to shift the arm in the counterclockwise direction as viewed in FIGURES 2 and 3. A tension spring 113 is connected between a point 114 on slide plate 74 and a screw 115 secured to arm 111 so as to resist the counterclockwise movement of arm 111.

A spring arm 116, FIGURE 2, is secured to edge 74*b* of slide plate 74 and has a plate 118, FIGURE 3A, on the free end portion thereof designed to engage with an end edge of a plate 420, FIGURE 3A, to latch the slide plate 74 in its active position shown in FIGURE 3.

A trip lever 117 is pivotally mounted on a pin such as indicated at 119 so that slight counterclockwise pivotal movement of the lever 117 from the position shown in FIGURE 3 will shift metal pad or plate 118 on the end of arm 116 to the right as viewed in FIGURE 3 so as to disengage the plate 118 from the edge of plate 420. Release of this latch serves to restore the parts to the position shown in FIGURE 2 from the active positions shown in FIGURE 3. Pivotal movement of the trip lever 117 is controlled by means of a lug 120 pivotally mounted at 121 within the arm 111. The pivotal lug 120 has a finger 120*a* engageable with end 117*b* of trip lever 117 so that when lug 120 is pivoted in the clockwise direction about point 121, lever 117 is pivoted in the counterclockwise direction about pivot 119 to release the latch 118 from the edge of plate 420. The pivotal lug 120 is arranged with a surface 120*b* along the path of the threading leader from the supply cartridge 60 to the take-up cartridge 50, so that when the threading leader engages with the take-up cartridge, sufficient tension is applied to the threading leader to pivot lug 120 slightly in the clockwise direction about its pivot point 121.

As slide plate 74 is moved to the active position and arm 111 is rotated in the counterclockwise direction, a lower edge face of arm 111 engages an arm 122 which is pivotally mounted on the plate 76 by means of a pin located as indicated at 123 so as to drive the arm 122 in the counterclockwise direction causing a pin 124 on arm 122 to drive member 125 in the clockwise direction with respect to its pivot indicated at 126. The pivot 126 is carried by a guide block 127 secured by means of screws such as 128 to plate 76.

The arm 125 has secured therewith a guide tongue 130 of springy metallic material which is adapted to press the threading leader against a guide surface 111*b* of arm 111 and against the engaging face 120*b* of pivotal lug 120 as the threading leader is guided into proximity with the take-up cartridge.

A guiding finger 135 is pivotally secured to the arm 125 at point 136 so that as the arm 125 moves in the clockwise direction, the finger 135 is pivoted by means of tension spring 137 so as to be projected into engagement with the hub 50*b* of take-up cartridge 50. The spring 137 is connected between a point 138 on finger 135 and a fixed screw 139 secured to block 127. In FIGURE 3, finger 135 has been shown in its extreme clockwise position, but it will be understood that when the take-up cartridge 50 is present, the finger 135 will ride on the surface of hub 50*b*. The finger 135 may have a pair of relatively thin ridges 135*a* extending in the peripheral direction with respect to the hub 50*b* and offset with respect to the rows of peripheral teeth 140 on hub 50*b* so that the edge faces of ribs or ridges 135*a* rest directly on the peripheral surface of hub 50*b* in the absence of the threading leader.

Similarly, roller 85 has been shown in its extreme counterclockwise position which it would assume in the absence of a take-up cartridge 50. With the cartridge 50 present as indicated in FIGURE 3, the peripheral surface 85*a* would be in engagement with the peripheral edges 50*a* of the flanges of the cartridge 50. Similarly, roller 86 has been shown in its extreme clockwise position, which it would assume in the absence of a supply cartridge 60, and with the supply cartridge present, the periphery 86*a* of roller 86 would be in engagement with the periphery 60*a* of the flanges of cartridge 60.

A bracket 150 has an upstanding part 151 with an edge 151*a* for limiting pivotal movement of the arm 135 in the absence of a take-up cartridge 50. The face 151*b* of the plate 151 cooperates with a surface of finger 135 to return the finger 135 to the inactive position shown in FIGURE 2 upon return of arm 125 to its inactive position.

Actuation of the slide plate 74 is also designed to pivot a lever arm 170 about a pivot point 175, the arm 170 operating between plate 76 and an underplate 176 interposed between the reinforcing plate 76 and cover plate 40*a*. In the illustrated embodiment, the reinforcing plate 76 is provided with a recess as indicated at 76*b*, FIGURE 5, within which the arm 170 is movable. The arm 170 carries a pin 180 which is coupled to a strip 181 which in turn is coupled with a reciprocally movable slide bar 183. The slide bar 183 is connected with a stripping finger assembly 185, FIGURE 2. A tension spring 190 is connected to the slide plate 74 by screw 88 and is connected to the stripping finger assembly 185 by means of a screw 192 so that the spring 190 tends to resist lateral movement of the stripping finger assembly 185 to the right as viewed in FIGURE 2.

A bracket 200 is secured by means of screws such as 201 to plate 76 and has an upstanding flange 200*a* carrying a leaf spring 205 whose free end is engageable with a stripping lug 210 pivotally carried at 211 with the stripping finger assembly 185. In the retracted position of the stripping finger assembly 185 shown in FIGURE 2, the free end of spring 205 holds lug 210 in its extreme clockwise position against the action of a wire spring diagrammatically indicated at 213. The wire spring 213 is coiled about the pin 211 and has one end engaging the left end of lug 210 and an opposite end fixed so as to urge the lug 210 in the counterclockwise direction.

The stripping finger assembly 185 also carries guide strip member 220 which in the extended position of the stripping finger assembly 185 shown in FIGURE 3 is designed to hold the threading leader in a channel 230*a* of a fixed threading guide member 230 secured to the plate 76. The channel 230*a* is arranged at a height or spacing from the plate 76 corresponding to the position of the threading leader on a supply cartridge in operative position. The channel has a height substantially corresponding with the width or height of the threading leader so that the lower surface of the channel supports the lower edge of the threading leader as it moves along the channel during the threading operation.

The stripping finger assembly 185 is connected with a slide bar 240 slidably carried in a groove of plate 76 so as to slide to the right as viewed in FIGURE 2 as the stripping finger assembly 185 moves to the right. The slide bar 240 is provided with a head piece 240*a* engaging with a pivotal plate member 250 which is pivotal about a point 251 under the impetus of a wire spring 252 having one end 252*a* secured to an abutment of guide member 230 and an opposite end 252*b* engaging a pivot pin 260 carried by the pivot plate member 250. Thus, as slide bar 240 moves to the right, spring 252 pivots plate member 250 in the clockwise direction with respect to its pivot point 251 to move pivot point 260 in the clockwise direction. The pivot pin 260 is coupled with a guide finger 270 which is pivotally mounted at 271 on guide member 230 by means of a link arm 272 pivotally carried on pin 260 at one end and pivotally connected to the finger 270 as indicated at 273 at its opposite end. Thus, as slide bar 240 is moved to the right, plate member 250 pivots in the clockwise direction, shifting arm or link 272 upwardly so as to pivot finger 270 in the counterclockwise direction about point 271 until it assumes the position indicated in FIGURE 3 with a surface 270*a* riding on the outer peripheral surface of the leader of supply cartridge 60. The height dimension of surface 270*a* is less than the spacing between the flanges of the supply cartridge 60 so that the finger 270 at its surface 270*a* can fit between the peripheral edges of the flanges of the supply cartridge and engage the external surface of the leader.

The stripping edge 210*a* of stripping lug 210 is advanced to a position such as indicated in FIGURE 3 where it will be pressed against the outer surface of threading leader 61 and serve to strip the leading edge of the threading leader from the supply cartridge and guide it along the channel 230*a*.

A slide plate 300 is mounted in a groove 76*a* of plate 76 and has pins 301 and 302 for engagement with the edges of slide plate 74 during its movement to active position and during its movement to retracted position, respectively.

As a further part of the threading path, the adaptor mechanism is provided with a threading guide channel 340 which is mounted by means of blocks 341 and 342 for vertical reciprocating movement on pins 343 and 344 extending from the plate 76. Arms 350 and 351 are pivotally secured at one end to the blocks 341 and 342 by means of pins such as indicated at 352 in FIGURE 3B and pivotally secured at the opposite end to mounting blocks 353 and 354 by means of pins such as indicated at 357 in FIGURE 3B. Wire springs 355 and 356 urge the arms 350 and 351 toward their upper retracted position. The mounting arms 350 and 351 have cam surfaces such as 350*a*, FIGURE 3B, which cooperate with cam surfaces such as 370*a* on slide bars such as 370, FIGURE 3B, the slide bars being reciprocal in channels such as indicated at 76*d* and 76*e* in plate 76. The slide bar 370 for actuating arm 350 includes an abutment 370*b* which is actuated by part 300*a* of slide plate 300. A similar arrangement is provided for arm 351 so that as slide plate 74 moves in the counterclockwise direction about its pivot 75, arms 350 and 351 rotate so as to move guide channel 340 into threading position where the channel strips 340*a* and 340*b* extend along a loading path between the various transducer heads and drive elements of the machine as best seen in FIGURE 1. In other words, the guide channel strips 340*a* and 340*b* descend into the loading slot of the conventional machine in the same way that a tape is loaded edgewise into the slot during normal threading.

The lower end of the channel 340 is open so that the channel 340 may be moved upwardly after the threading operation to leave the threading leader and tape in operative position with respect to the loading slot of the conventional machine.

The relationship of the tape threading path to the channel 340 may be seen in FIGURE 3B where the position of the threading leader 61 corresponds substantially to the tape threading path, the tape threading leader 61 being shown as passing over tape guide 388 having a tape guiding groove 388*a* of dimensions to accurately position the magnetic tape record medium relative to the various components of FIGURE 1. Tape guide post 387 in FIGURE 1 may have a similar guiding groove. The threading leader 61 is sufficiently stiff so as to be maintained in the guide channel 340 in the lower position thereof indicated at 340′ in FIGURE 3B during the threading operation even though the lower end of the guide channel 340 is open as indicated. The leader is supported as it leaves the supply cartridge 60, FIGURE 2, by means of the floor of the guide channel groove 230*a* of guide channel number 230, FIGURE 2. The arrangement is such that the leading end 61*a* of leader 61, FIGURE 4, is automatically guided from the groove 230*a* along the path between the channel members 340*a* and 340*b* in their lower position indicated at 340′ in FIGURE 3B. (FIGURE 3B is of course inverted with respect to the orientation shown in FIGURE 1 since FIGURE 3A is a bottom plan view.)

As the leader reaches the take-up end of the threading path, it engages in guide channel 125*a*, FIGURE 3, which guides the leader between spring finger 130 and a guiding face 111*b*, FIGURE 2.

As best seen in FIGURE 2, the guide finger 220 is carried on stripping finger assembly 185 by means of a bracket 384 and is movable with the stripping finger assembly into close relation to the groove 230*a* of guide member 230. The guide finger 220 thus retains the threading leader in the guide channel 230*a* during the threading operation.

By way of example, the threading leaders 61 and 62 may be of Mylar tape having a thickness of between .005 inch and .008 inch. The guide channel 230*a* may have a length of at least about 1½ inches so as to provide the vertical edgewise support for the threading leader as it spans from the supply side to the take-up side of the threading channel 340. With this degree of support of the lower edge of the threading leader, no further edge support is necessary along the entire length of the threading channel 340. As is apparent from FIGURE 3B, the threading path as represented by threading leader 61 is substantially above the surface of base plate 70, FIGURE 1, on which the magnetic heads 23 and 24 are mounted. The undersurfaces of the cartridges 50 and 60 are, of course, spaced slightly above the surface of plate 70 so that the tape path is necessarily substantially spaced above the surface of plate 70 in the normal construction of conventional magnetic tape recorders.

Further details of the illustrated embodiment have been shown in FIGURES 1A, 3A and 3B and FIGURE 5 so as to afford by way of example specific details of an exemplary embodiment of the present invention.

Referring to FIGURE 5, a roller 389 is illustrated which is secured to slide plate 74 and extends through an elongated slot in reinforcing plate 76 so that as the plate 74 moves downwardly about the pivot 75 as viewed in FIGURE 2, roller 289 moves downwardly as viewed in FIGURE 5, engaging a cam surface 290*a* of actuator member 390 so as to drive the elongated finger part 390*b* of the actuator generally to the left and downwardly as viewed in FIGURE 5. The finger part 390*b* is guided by a groove connecting with groove 76*c* in the reinforcing plate 76. The groove is of configuration closely corresponding to the configuration of the finger part 390*b*. The rounded forward end 390*c* of finger part 390*b* engages in a portion 170*a* of arm 170 to pivot the arm 170 in the counterclockwise direction about its pivot point 175 as viewed in FIGURE 5 so as to drive the stripping finger assembly 185 to the left as viewed in FIGURE 5.

Referring to FIGURES 1 and 1A, it will be observed that the shaft 15 is coupled with the capstan pressure roller 400 so as to retract the capstan pressure roller 400 in the stop and thread positions of shaft 15. Specifically, the capstan pressure roller 400 is carried on an arm 401 which is pivotally mounted at 402. A control roller 403 is mounted on a plate 404 and is arranged to engage a plate 401*a* of arm 401 so as to move the pressure roller 400 to the retracted position shown in FIGURE 1 against the action of a tension spring 399 which is indicated in FIGURE 1. The plate 404 which is rotatable relative to the shaft 15 but is fixed axially of the shaft 15. Secured to the shaft 15 is a plate 406 carrying a pivotal arm 450 by means of a pin 451. The pivotal arm 450 has a pin 407 depending therefrom and riding on the periphery 404$a$ of plate 404. As shaft 15 is moved from the thread position shown in FIGURE 1A to the "stop" position, pin 407 is guided into a notch 404$b$ by engagement of a face 450$a$ of arm 450 with a fixed cam plate 460. Further rotation of the shaft 15 in the clockwise direction as viewed in FIGURE 1A causes the plate 404 to turn with the plate 406 shifting the roller 403 in the clockwise direction with respect to the axis of shaft 15. This movement of roll 403 as the shaft 15 is moved to the play position releases arm 401 and allows the spring 399 to move the pressure roller 400 into pressure engagement with the tape extending between the pressure roller and capstan 25.

In the specific illustrated embodiment, a steel plate 1/16 inch thick by ½ inch was added at position 401$a$ to increase the distance that the pressure roller 400 is retracted from the capstan 25. This increased distance was desirable to provide adequate clearance for the tape guide slot assembly 340. The desired retracted position of capstan pressure roller 400 is indicated in FIGURE 1. The arm 450 and notch 404$b$ allow plate 406 to be moved to the thread angular position without movement of roll 403 from the "stop" position thereof.

Also as best seen in FIGURE 1A, plate 406 is provided with a pin 454 riding in a slot 455 of a further plate 456. As the plate 406 is moved from the stop to the thread position, pin 454 engages the right end of slot 455 to rotate plate 456 in the counterclockwise direction as viewed in FIGURE 1A to shift roller 44, FIGURE 1, downwardly and to release the brake means 33 as previously described. As the plate 406 is moved to the play position, pin 454 merely moves from the right end of slot 455 to the left end thereof and does not rotate plate 456 from its stop orientation. In the stop orientation of plate 456, the pressure on roll 44 is released, and the brakes such as indicated at 33 are applied. The slot 455 thus in effect simply provides freedom of movement of the plate 406 from the stop to the play position without altering the condition of roller 44 or brake means 33. Other mechanism associated with knob 14 brings about a release of the brake means 33 and an application of the take-up drive means 44 after the shaft 15 has been moved from stop to play position.

As indicated in FIGURE 1, a further brake means 411 may be associated with the take-up spindle 30 and cooperate with a drum or the like rotatable with the spindle 30. The brake arm 411 is pivotally mounted at 412 and is urged in the counterclockwise direction by means of tension spring 414. A release cable 410 is provided wrapped about the member 53 so as to provide for release of brake means 411 along with brake means 33 when shaft 15 is moved from the stop to the thread position.

FIGURE 3A has been previously referred to as showing certain details in bottom plan which are difficult to visualize in FIGURES 2 and 3 because of the positions of adjacent parts. The reference numeral 420 may indicate a plate secured by means of screws 421 to member 111 and with which latching arm 116 cooperates as previously described.

FIGURE 3B has also been previously referred to in connection with the description of the threading guide channel 340.

FIGURES 6 and 7 show a modified tape cartridge which may be assumed to be the take-up cartridge, and primed reference numerals have been applied to corresponding parts so that the structure of this embodiment will be apparent by reference to the preceding description. The present modification provides radially extending shoulder parts such as indicated at 461–466 projecting into the interior space of the cartridge adjacent the hub 50'$b$ so that the threading leader 61 is shifted edgewise into a continuous annular groove 460 in the flange 50'$c$ of the cartridge. The arm 135 of FIGURES 2 and 3 may serve to press the threading leader 61' into the position shown in FIGURE 6 so that the pins 50$g$ of the take-up cartridge of FIGURE 2 may be omitted together with the apertures in the threading leader indicated in FIGURE 4.

As a further alternative, it will be understood that the latching arrangement including parts such as 117 and 118 in FIGURES 2 and 3 may be omitted, and the parts maintained in the latched or threading position by manual pressure on the actuating knob 470 on shaft 15. In this case, the operator would simply hold the knob 470 on shaft 15 in the thread position manually until the threading operation were completed and then would release the knob to allow the shaft 15 to return to the stop position and to allow all of the parts to be returned by spring means to their inactive positions.

In the illustrated embodiment, the machine is such that the supply spindle 31 is shifted from the position shown in solid outline in FIGURE 2 to the dotted position labeled 31' when the knob 14 is moved to rewind position, and this shifting of the supply spindle 31 causes tuck-in roller 95 to project between the flanges of the supply cartridge so as to be operative to tuck the threading leader 61 behind the shoulders 60$e$, 60$f$ of the supply cartridge at the end of the rewind operation. Roller 86 may be so positioned in its inactive position that it does not engage cartridge 60 when cartridge 60 is shifted with spindle 31 to the rewind position.

As a further modification, the cartridges may have straight flanges without the confronting shoulder portions, and the leaders may have protruding teeth or the like for engaging the smooth side walls of the flanges for holding the leaders in wrapped relation on the hub portions of the cartridge and in wrapped relation about a coil of tape on the cartridge.

The teeth 50$g$, 60$g$ may be conveniently provided by wrapping a thin strip of metal about the hub portions such as 50$b$ and 60$b$ of the cartridges with the strip having the teeth struck up therefrom. The ends of the strip may extend into and be anchored in a radial groove in the hub part 50$b$, for example. If desired, the successive teeth may be directed at slight angles to the radial direction and in opposite directions so as to facilitate engagement of the threading leader with the teeth in either direction of rotation of the teeth relative to a threading leader to be engaged therewith.

As seen in FIGURE 2, the supply cartridge driving belt 84 is driven by a pulley 480 of relatively small diameter coaxial with roller 85 so that supply cartridge 60 has a reduced rate of rotation as compared with take-up cartridge 50. The dimensions are such that the leader portion 61 is driven by the supply cartridge along the threading path at a reduced linear speed as compared to the tangential velocity of the teeth 140 on the hub 50$b$ of the take-up cartridge 50 so that the teeth 140 will engage in the apertures 61$a$ of the leader portion 61, FIGURE 4, and initiate winding of the leader portion 61 on the hub 50$b$.

*Summary of operation*

In placing the machine in operation, knob 14 is initially in the position shown in FIGURE 1 and shaft 15 is in the "stop" position. The automatic threading mechanism is in the position shown in FIGURE 2 with shaft 15 in the stop position. An empty cartridge 50 is placed on the take-up spindle 30 and a full cartridge 60 is placed on the supply spindle 31.

The shaft 15 is then moved to the "thread" position which is the position actually shown in FIGURE 1 and corresponds to the position of the threading mechanism shown in FIGURE 3. In this condition, the driving motor drives pulley 49, FIGURE 1, and thus drives the take-up spindle 30 through belt 46. The take-up cartridge 50 is thus rotated in the clockwise direction as viewed in FIGURE 3, to drive roller 85, FIGURE 3, in the counterclockwise direction and thus to drive roller 86 in the counterclockwise direction through belt 84 as viewed in FIGURE 3. (The rollers 85 and 86 are spring urged to extreme positions such as shown in FIGURE 3, but with the cartridges 50 and 60 present, the rollers would engage the peripheries 50*a* and 60*a* of the cartridges and thus would be not actually in the extreme positions shown in FIGURE 3.) The result is that the roller 86 drives supply cartridge 60 in the clockwise direction as viewed in FIGURE 3.

As cartridge 60 rotates in the clockwise direction as viewed in FIGURE 3, stripping edge 210*a* (which is shown in its extreme position but which would actually engage and slide on the outer periphery of leader 61 with a full cartridge present on the supply spindle) engages with the free end 61*a* of the leader 61 to strip the leader 61 from behind confronting shoulder portions 60*e* and 60*f* and to guide the threading leader along the channel 230*a* of threading guide 230 and along the threading path defined by channel guide member 340 and then along the channel defined by groove 125*a* in arm 125 together with spring blade 130 (FIGURE 2) and surfaces 111*b* and 120*b* (FIGURE 2). These cooperating surfaces may hold the threading leader in a plane slightly inclined to the vertical so that the threading leader fits more easily between the confronting annular shoulder portions 50*e* and 50*f* of the take-up cartridge 50. The finger 135 serves to guide the leading end of the threading leader into engagement with the teeth 50*g* of the hub 50*b* to engage the threading leader with the hub 50*b* for winding of the record medium thereon.

As soon as the threading leader is engaged with the take-up cartridge 50, the tensioning of the threading leader causes pivotal movement of the lug 120 about its pivot point 121 to shift trip lever 117 about its pivot point 119 and thus to release latching spring 116 from the end portion of plate 420, FIGURE 3A. This allows the various spring means which have been tensioned including the resilient belt 84 to return the slide plate 74 to its initial inactive position shown in FIGURE 2 and to lift the guide channel 340 out of the threading slot of the conventional tape recorder with which the threading mechanism is associated.

The shaft 15 is now moved to the stop position to shift roller 44 in the upward position as viewed in FIGURE 1 and thus to release the drive of the take-up cartridge 50. With the take-up cartridge 50, the tensioning of the threading leader causes pivotal movement of the lug 120 about its pivot point 121 to shift trip lever 117 about its pivot point 119 and thus to release latching spring 116 from the end portion of plate 420, FIGURE 3A. This allows the various spring means which have been tensioned including the resilient belt 84 to return the slide plate 74 to its initial inactive position shown in FIGURE 2 and to lift the guide channel 340 out of the threading slot of the conventional tape recorder with which the threading mechanism is associated.

The shaft 15 is now moved to the stop position to shift roller 44 in the upward position as viewed in FIGURE 1 and thus to release the drive of the take-up cartridge 50. The automatic threading operation is now complete, and shaft 15 may be actuated in the clockwise direction to initiate a transducing operation of the threaded record medium.

As illustrated in the fifth figure of the copending application Serial 124,683, the threading leader may include a non-apertured portion of length to form a smooth cylindrical configuration resting on the outer tips of the teeth 50*g* of the take-up cartridge. The leaders 61 and 62 preferably each have a length substantially equal to an integral number (two or greater) times the take-up hub circumference. Preferably, the length of the leaders 61 and 62 is such that they will completely cover the outer turns of the record medium itself when the leader is at the outer periphery of a cartridge as illustrated for the leader 61 in FIGURE 3. The leaders also have a length at least corresponding to the length of the threading path from the supply cartridge to the channel 125*a* at the take-up side of guide channel 340 since the leader is not supported along the length of channel 340 in the illustrated embodiment.

The parts such as 85, 86, 95, 120 and 210 when in the position shown in FIGURE 2 preferably provide clearance spaces corresponding to the size of the cartridges so that the cartridges can be easily and conveniently inserted on the spindles 30 and 31.

If after automatic threading, a transducing operation is stopped before the inner threading leader 62 is disengaged from the supply cartridge 60, shaft 15 may be actuated from the play, record position to the stop position and knob 14 actuated to the rewind position to rewind the record medium onto the supply cartridge 60. During the rewind mode, the supply spindle is at position 31′ so that the tuck-in roller 95 will have a position so as to press the leader 61 behind the confronting shoulder portions 60*e* and 60*f*.

On the other hand, if after automatic threading and during the transducing operation, the record medium and threading leader 62 are completely unwound from the supply cartridge 60 and completely wound onto the take-up cartridge 50, the tip end 120*c* of lug 120 will tend to tuck in the free end of the threading leader 62 behind the confronting shoulder portions 50*e* and 50*f* of the take-up cartridge. Then, to play a second channel or channels, the cartridges 50 and 60 may be removed and inverted, and the cartridge 50 placed on the supply spindle 31 while the empty cartridge 60 is placed on the take-up spindle 30. The machine is now ready to be cycled again through the automatic threading operation to wind the record medium from cartridge 50 onto cartridge 60.

The description of a further modification found at pages 25–27 of application Serial 124,683 is specifically incorporated herein by reference. By way of a further similar example, it may be noted that threading between a supply cartridge 60 and a take-up cartridge 50 may be effected above the transducer path of transducer machine 10. After the automatic threading operation has been completed, the supply cartridge 60, the take-up cartridge 50 and the length of record medium extending therebetween along the threading path may be allowed to drop vertically downwardly onto the transducer machine so that the length of the record medium is located in the loading slot of the transducing machine. In this type of embodiment, the channel member 340, FIGURE 2, would be located at a fixed vertical position above the loading slot of the transducing machine. Suitable means may initially retain the supply cartridge and take-up cartridge in spaced relation above supply spindle 31 and take-up spindle 30 and such means may comprise, for example, three rollers having lower flanges which normally underlie the respective supply and take-up reels or cartridges and rotatably support the cartridges above the supply and take-up spindles. One roller associated with the supply cartridge would correspond to the roller 86 and would be driven from the roller 85, for example, providing the take-up spindle were in driving engagement with the take-up cartridge 50. For example, the take-up spindle may be provided with an adaptor extension so as to be in driving engagement with the take-up cartridge both in the upper threading position of the take-up cartridge and in the lower transducing position of the take-up cartridge on the spindle. A shiftable bottom plate may normally close the bottom side of the threading path so as to support the record medium during the threading operation as it travels through the threading path guide means 340. This bottom plate may be shifted to register a slot therein with the threading path of guide 340 so as to allow the tape to drop into the transducing path of the transducer mechanism. At the same time, two or more of the rollers including rollers similar to 85 and 86 supporting the supply and take-up cartridges may be shifted to allow the supply cartridge to drop into transducing position on the supply spindle and the take-up cartridge to drop into transducing position on the take-up spindle. The shifting of the bottom plate may take place automatically in response to tripping of lug 120 along with the retraction of rollers 85 and 86 as in the embodiment of FIGURES 2 and 3. The cover plate may be designed to provide manual access to the supply and take-up cartridges for removal of the cartridges from the supply and take-up spindles after play of the record medium. The supply and take-up cartridges are of identical configuration and may be inverted and interchanged to play a second channel on the record medium if desired. Suitable tuck-in means may be carried by the adaptor plate similar to the tuck-in means 95 in FIGURE 2 for insuring engagement of the threading leaders with the supply or take-up cartridges while the cartridges are in the lower transducing positions. For example, a tuck-in roller such as indicated at 95 would simply be spaced a greater distance downwardly from cover plate 40*a*, the increase in distance corresponding to the distance of vertical movement of the cartridges from the threading position to the transducing position. A similar roller would be provided in association with the take-up cartridge 50 as viewed in FIGURE 2.

Referring to FIGURES 6 and 7, it will be observed that the shoulder 461 tapers inwardly as indicated at 461*a* toward the center line of the spool. The shoulders such as 461 may intersect with an annular groove 473 and thus divide the groove into a succession of arcuate segments as indicated in FIGURE 7. The shoulder parts 461–466 are very simply formed, for example during molding of two separate parts each including one of the flanges which are assembled to form the cartridge.

As a modification of the embodiment shown in FIGURES 6 and 7, the alternate shoulder parts 462, 464, and 466 may be provided on the flange 50'*c* so as to reduce the extent of bending required by the leader in being pressed into the position in alignment with grooves 460, 473 shown in FIGURE 6. That is, longitudinally offset portions of the leader are indented or flexed alternately at opposite margins rather than requiring flexure of the leader along its length at one margin only as in the embodiment of FIGURES 6 and 7.

As a further embodiment of cartridge, in place of the teeth 50*g* projecting from the hub, a ring-shaped thin metal plate may be embedded in one of the flanges such as 50*c* adjacent the hub 50*b* so that the inner surface of the plate is generally flush with the inner surface of the flange 50*c*. The ring may have narrow spring fingers struck at spaced intervals from the radially inner margin thereof with the free ends of the fingers extending into an annular groove in the hub 50*b* directly adjacent the flange 50*c*. The opposite flange 50*d* may have an annular groove just as indicated at 473, for example. The spring fingers then tend to engage the edge of the leader as it is directed onto the take-up cartridge so as to press the opposite edge of the leader into the groove in flange 50*d*. The edgewise gripping action provided by the spring fingers and the annular groove is sufficient to enable wrapping of the leader on the take-up spool with the arrangement shown in FIGURES 2 and 3 without any teeth on the hub as in the embodiment of FIGURES 2 and 3.

With respect to each of the embodiments where the take-up cartridge has annular beads or shoulder portions 50*e*, 50*f* or 50'*e*, 50'*f*, even if the threading leader is directed between the flanges such as 50*c* and 50*d* with the plane of the leader being entirely vertical, the clearance space between the guide means 120, 125*a*, FIGURE 3, and the adjacent shoulder portions of cartridge 50 is sufficient to enable the leader to tilt slightly so as to fit between the shoulder portions 50*e* and 50*f*. This tilting action of the leader even from a perfect vertical plane takes place automatically because of the resiliency of the leader and the manner in which it is directed toward the cartridge. As previously mentioned, however, the leader may be tilted slightly from a vertical plane by the guide means such as 120, 130, FIGURE 2, so that the leader will always tilt in a predetermined direction as it is directed between the flanges of the take-up cartridge. The tilting of the threading leader from the vertical provided by the guide means 120, 130 may be less than that required for the threading leader to pass between the confronting shoulder portions 50*e* and 50*f* since the additional tilting required will take place automatically because of the flexibility of the threading leader.

It may be noted that in the illustrated embodiment, no tuck-in roller such as roller 95 is provided in association with the take-up cartridge 50. Such a tuck-in roller is desirable in order to tuck the threading leader 62 behind the confronting portions 50*e* and 50*f* of the take-up cartridge if the record is to be completely wound onto the take-up cartridge. Where the take-up spindle 30 does not shift as is the case with the supply spindle 31, it is advantageous to provide a tuck-in roller for the take-up cartridge which will shift into an operating position when the machine is placed in the play or fast forward modes. It will be apparent that such a tuck-in roller may be coupled for movement with roller 44, FIGURE 1, so that whenever roller 44 is moved downwardly (as viewed in FIGURE 1) to engage the take-up reel drive belt 46, the tuck-in roller will be moved to a position extending into the space between the confronting shoulders 50*e* and 50*f* of the take-up cartridge. In the play mode, the roller 44 is moved downwardly by means of rotation of plate 404, FIGURE 1A, which is linked to the various mechanisms associated with the play mode in the conventional machine. It will be understood that while link 43 at this time is in an upper position, the roller 44 is freely movable to engage the take-up drive because of the elongated slot 43*a* in link 43.

In the illustrated embodiment where the drive roller 86 engages the flanges 60*c*, 60*d*, rather than the outer surface of leader 61 in rotating the cartridge 60 during the threading operation, the leader 61 preferably has a length so that the leader still has a substantial wrap about the cartridge 60 at the supply position when the leader end has been firmly engaged with the cartridge 50 at the take-up position. This insures that drive roller will continue effectively driving leader 61 until the end thereof has been firmly coupled with the take-up cartridge. In a symmetrical system where the cartridges may be inverted and interchanged the leader 62 should, of course, have the same length as leader 61.

It will be apparent that many further modifications and variations may be effected without departing from the scope of the novel concepts of the present invention.

We claim as our invention:

1. In an automatic threading transducing machine, take-up means for automatically engaging with a record medium leader portion delivered thereto along a threading path and for thereafter receiving the record medium as it is moved along a record medium path during a transducing operation, means for moving a record medium leader portion along the threading path toward the take-up means, guide channel means movable vertically in the plane of said threading path between an active guiding position and an inactive position and operable in the active position thereof to guide the record medium leader portion along the threading path and into engagement with the take-up means and in the inactive position thereof being spaced from the record medium path, and means coupled with said guide channel means for moving said guide channel means vertically to the inactive position thereof out of engageable relation to the record medium after engagement of the record medium threading portion with the take-up means.

2. An automatic threading system comprising a take-up spool having a hub with a cylindrical surface and having retaining means adjacent said hub for automatically retaining a record medium leader portion of tape configuration and of predetermined width for winding on said cylindrical surface, means for delivering a record medium threading portion to the hub along a threading path lying generally in a tangential plane extending tangentially to said hub cylindrical surface, said spool having flange means extending radially from said hub and having peripheral portions at the radially outer margins of said flange means with a space therebetween of an axial dimension less than the predetermined width of said record medium threading portion, and guide channel means adjacent said take-up spool and extending generally along the threading path and defining a guide channel lying in a guide channel plane disposed at a slight angle to said tangential plane to tilt said record medium threading portion as it is moved toward the peripheral portions of the spool to facilitate movement of the record medium threading portion between said peripheral portions and into engagement with said retaining means.

3. An adaptor mechanism for a transducing machine having a drive mechanism including an external driven part and having means for receiving a supply cartridge capable of being driven for automatic threading of a record medium thereof, said mechanism comprising supply cartridge driving means for driving a supply cartridge on the transducing machine in a forward direction for moving a record medium threading portion of the supply cartridge along a threading path, coupling means coupled to said driving means and arranged for driven engagement with an external driven part of the transducing machine to drive said driving means from the external driven part of the transducing machine, and means for securing said mechanism to a transducing machine with said driving means in driving relation to the supply cartridge of the transducing machine and with the coupling means in driven relation to the external driven part of the transducing machine.

4. An automatic threading adapter mechanism for a transducing machine, said adapter mechanism comprising a casing having supply and take-up positions and access means for accommodating delivery of a supply cartridge to the supply position and a take-up cartridge to the take-up position and having a threading path from the supply position to the take-up position, means for automatically threading a record medium from a supply cartridge at the supply position to a take-up cartridge at the take-up position comprising an elongated record medium guide channel extending along said threading path for guiding a record medium as it is moved from the supply cartridge to the take-up cartridge, means engageable with a take-up cartridge at the take-up position and with a supply cartridge at the supply position for driving the supply cartridge in an unwinding direction in response to driving of the take-up cartridge in the forward direction during an automatic threading operation, and means providing for relative movement of the record medium extending along said threading path and said guide channel to separate said record medium from said guide channel and to expose said record medium for scanning engagement with scanning elements of the transducing machine.

5. A threading mechanism for mounting on a transducing machine to adapt said machine for automatic threading of a record medium leader portion from a supply cartridge to a take-up cartridge on said machine, said mechanism comprising driving elements movable between an active and an inactive position and in the active position thereof being engageable with said supply and take-up cartridges for driving of the supply cartridge from the take-up cartridge during a threading operation, guide path elements movable between active and inactive positions and in the active position thereof providing a guide path for a record medium leader portion travelling from the supply cartridge to the take-up cartridge, and means for moving said driving and guide path elements between their active and inactive positions.

6. A threading mechanism for a transducing machine for automatically threading a record medium leader portion from a supply cartridge to a take-up cartridge on said machine, said mechanism comprising driving elements movable between an active and an inactive position and in the active position thereof being engageable with said supply and take-up cartridges for driving of the supply cartridge from the take-up cartridge during a threading operation, guide path elements movable between active and inactive positions and in the active position thereof providing a guide path for a record medium leader portion travelling from the supply cartridge to the take-up cartridge, means for moving said driving and guide path elements between their active and inactive positions, and means mounting said driving and guide path elements for attachment to a transducing machine as a unit.

7. A transducer machine comprising means for mounting a supply cartridge and a take-up cartridge at respective supply and take-up positions, drive elements movable between an active and inactive position and in the active position thereof being engageable with said supply and take-up cartridges for driving of the supply cartridge from the take-up cartridge during a threading operation, guide path elements movable between an active and an inactive position and in the active position providing a guide path for a record medium leader portion from the supply cartridge to the take-up cartridge, means for moving said elements between their active and inactive positions, and means mounting said drive and guide path elements on said machine for detachment from the machine as a unit to accommodate manual threading operation of the machine.

8. A transducer machine comprising supply means for receiving a cartridge having a record medium including a leader portion releasably held in wound relation thereon, take-up means for automatically engaging with a record medium leader portion delivered thereto from a cartridge at the supply means, automatic threading means movable between an active threading position and an inactive position and operable in the active position to automatically disengage the leader portion from the cartridge to deliver the record medium leader portion completely automatically from a cartridge at the supply means to the take-up means for automatic engagement therewith, means for automatically moving said threading means to inactive position in response to completion of a threading operation, spring means tending to restore said threading means to inactive position, and a latch mechanism for retaining said threading means in active position and responsive to completion of a threading operation to release said threading means for return to inactive position under the impetus of said spring means.

9. In an automatic coupling mechanism for coupling a record medium with a take-up device, a take-up cartridge comprising a spool having a hub and flanges extending from the axially opposite sides of the hub, at least one of said flanges having inward projections projecting axially inwardly therefrom adjacent said hub and spaced about the periphery of the hub for engagement with and retention of a leader portion of a record medium, and a finger for automatically pressing a leader portion of a record medium into engagement with said hub against the friction of said inward projections.

10. A cartridge for receiving a record medium comprising a spool having a hub and flanges extending from the axially opposite sides of the hub, said flanges having inward projections projecting axially inwardly therefrom adjacent said hub with the inward projections of one flange being offset angularly from and interposed between the successive inward projections of the other flange for engaging and retaining a leader portion of a record medium to be wound on the hub, and said flanges having arcuate grooves therein adjacent said hub and axially opposite said inward projections each groove receiving said leader portion at an edge thereof opposite the edge engaged by the inward projection axially aligned therewith.

11. An automatic threading system comprising a take-up spool having a hub with a cylindrical surface and having retaining means for automatically retaining a record medium leader portion of tape configuration and of predetermined width, means for delivering a record medium threading portion to the hub along a threading path lying generally in a tangential plane extending tangentially to said hub cylindrical surface, said spool having flange means with annular shoulder portions extending from the flange means in an axial direction and terminating in confronting relation with a space therebetween of an axial dimension less than the predetermined width of said record medium threading portion, and guide channel means adjacent said take-up spool defining a guide channel extending generally along the threading path and lying in a guide channel plane disposed at a slight angle to said tangential plane to tilt said record medium threading portion as it is moved toward the annular shoulder portions of the spool to facilitate movement of the record medium threading portion between said confronting annular shoulder portions and into engagement with said retaining means.

12. An automatic threading system comprising a cartridge consisting essentially of a rotatable spool having only one record medium coil wound thereon, said record medium coil terminating in an outer threading portion wound about said record medium coil and terminating in a threading portion free end, said spool having means for retaining said threading portion therewith during handling, automatic threading means having a threading path and having a supply position at one end of the threading path for receiving said spool and having a take-up position at an opposite end of the threading path, a take-up assembly having spool means for receiving and retaining said threading portion free end, said automatic threading means being movable between an active threading position and an inactive position and operable in the active position to automatically disengage the threading portion from the spool and to deliver the record medium threading portion completely automatically from the spool at the supply position to said take-up position and providing for automatic engagement of the threading portion with said take-up assembly, said take-up assembly having positively acting means comprising a finger of curvature generally conforming with the curvature of the take-up assembly and engageable with said threading portion free end and operable to positively guide the threading portion free end radially inwardly into engagement with said take-up assembly, and means for automatically moving said threading means and said finger to inactive positions in response to completion of a threading operation, with said finger in its inactive position being entirely clear of said take-up assembly.

13. The automatic threading system of claim 12 with said means for automatically moving said threading means and said finger to inactive positions being responsive to the tension of the record medium produced by engagement thereof with said take-up assembly for automatically moving said threading means and said finger to said inactive positions.

References Cited by the Examiner

UNITED STATES PATENTS

| | | | |
|---|---|---|---|
| 2,578,283 | 12/1951 | Bornemann et al. | 242—76 X |
| 2,819,350 | 1/1958 | Steinegger | 242—67.4 |
| 3,081,925 | 3/1963 | Hanken | 226—91 |
| 3,149,797 | 9/1964 | Pastor et al. | 242—55.13 |

FOREIGN PATENTS

| | | |
|---|---|---|
| 324,528 | 1/1930 | Great Britain. |

MERVIN STEIN, *Primary Examiner.*

L. D. CHRISTIAN, *Assistant Examiner.*